(12) United States Patent
Aikawa et al.

(10) Patent No.: US 11,358,436 B2
(45) Date of Patent: Jun. 14, 2022

(54) VEHICLE-MOUNTED TEMPERATURE CONTROLLER

(71) Applicant: TOYOTA JIDOSHA KABUSHIKI KAISHA, Aichi-ken (JP)

(72) Inventors: Hidefumi Aikawa, Shizuoka-ken (JP); Manabu Orihashi, Okazaki (JP); Yoshio Hasegawa, Toyota (JP); Takashi Ogawa, Toyota (JP); Yuji Miyoshi, Susono (JP); Kunihiko Hayashi, Odawara (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 282 days.

(21) Appl. No.: 16/816,265

(22) Filed: Mar. 12, 2020

(65) Prior Publication Data
US 2020/0290426 A1   Sep. 17, 2020

(30) Foreign Application Priority Data

Mar. 13, 2019 (JP) .............................. JP2019-046062

(51) Int. Cl.
*B60H 1/00* (2006.01)
*B60H 1/22* (2006.01)

(52) U.S. Cl.
CPC ..... *B60H 1/00392* (2013.01); *B60H 1/00007* (2013.01); *B60H 1/00278* (2013.01);
(Continued)

(58) Field of Classification Search
CPC ........... B60H 1/00392; B60H 1/00007; B60H 1/00278; B60H 1/00321; B60H 1/00428;
(Continued)

(56) References Cited

U.S. PATENT DOCUMENTS

| | | | |
|---|---|---|---|
| 2015/0101789 A1* | 4/2015 | Enomoto | B60K 11/02 236/35 |
| 2016/0031291 A1* | 2/2016 | Enomoto | B60L 58/26 62/189 |

(Continued)

FOREIGN PATENT DOCUMENTS

JP      2015-186989 A      10/2015

*Primary Examiner* — Davis D Hwu
(74) *Attorney, Agent, or Firm* — Hauptman Ham, LLP

(57) ABSTRACT

A vehicle-mounted temperature controller includes a low temperature circuit and a refrigeration circuit. The low temperature circuit has a heat generating equipment heat exchanger exchanging heat with heat generating equipment, a radiator, a first heat exchanger, and a three-way valve. The refrigeration circuit has a second heat exchanger discharging heat from the refrigerant to a high temperature circuit to make the refrigerant condense, and the first heat exchanger making the refrigerant absorb heat from the cooling water to make the refrigerant evaporate. The low temperature circuit includes a first partial circuit through which the cooling water flows through the radiator and the first heat exchanger, and a second partial circuit through which the cooling water flows through the heat generating equipment heat exchanger without passing through the radiator and the first heat exchanger. The cooling water circulates simultaneously and separately at these first partial circuit and second partial circuit.

6 Claims, 11 Drawing Sheets

(52) U.S. Cl.
CPC ..... *B60H 1/00321* (2013.01); *B60H 1/00428* (2013.01); *B60H 1/00885* (2013.01); *B60H 1/22* (2013.01); *B60H 2001/00957* (2013.01); *B60H 2001/225* (2013.01); *B60H 2001/2265* (2013.01)

(58) Field of Classification Search
CPC ............... B60H 1/00885; B60H 1/22; B60H 2001/00957; B60H 2001/225; B60H 2001/2265
USPC ........................................................ 165/202
See application file for complete search history.

(56) References Cited

U.S. PATENT DOCUMENTS

| | | | |
|---|---|---|---|
| 2016/0101666 A1* | 4/2016 | Sugimura | .......... B60H 1/00785 236/5 |
| 2017/0021698 A1 | 1/2017 | Hatakeyama et al. | |
| 2019/0070951 A1* | 3/2019 | Lucke | .................... B60L 58/26 |

* cited by examiner

VEHICLE-MOUNTED TEMPERATURE CONTROLLER

RELATED APPLICATIONS

The present application claims priority of Japanese Patent Application No. 2019-046062, filed Mar. 13, 2019, the disclosure of which is hereby incorporated by reference herein in its entirety.

FIELD

The present disclosure relates to a vehicle-mounted temperature controller.

BACKGROUND

In the past, a vehicle-mounted temperature controller provided with a refrigeration circuit and a low temperature circuit has been proposed (for example, PTL 1). The refrigeration circuit is configured so as to realize a refrigeration cycle by circulation of a refrigerant. The low temperature circuit has a heat generating equipment heat exchanger exchanging heat with heat generating equipment, such as a power control unit (PCU) or motor-generator (MG). In such a vehicle-mounted temperature controller, the refrigeration circuit and the low temperature circuit share a single heat exchanger. This heat exchanger transfers heat from the cooling water of the low temperature circuit to the refrigerant to make the refrigerant of the refrigeration circuit evaporate.

Further, in the vehicle-mounted temperature controller according to PTL 1, a condenser radiating heat to the outside to make the refrigerant condense is provided at the refrigeration circuit. This radiated heat is used for heating a passenger compartment of a vehicle mounting the vehicle-mounted temperature controller.

CITATIONS LIST

Patent Literature

[PTL 1] Japanese Unexamined Patent Publication No. 2015-186989

SUMMARY

Technical Problem

In a vehicle-mounted temperature controller such as described in PTL 1, when heating the passenger compartment, heat is absorbed from the cooling water of the low temperature circuit through the refrigeration circuit and that heat is discharged to the passenger compartment. Therefore, for efficient heating, it is necessary to give heat to the cooling water inside the low temperature circuit. However, in the vehicle-mounted temperature controller according to PTL 1, the cooling water of the low temperature circuit flows through only the battery in addition to the heat exchanger, therefore it is not possible to give the cooling water sufficient heat and accordingly efficient heating is difficult.

Further, when heating the passenger compartment, it may be considered to make the cooling water of the low temperature circuit flow through the above-mentioned heat generating equipment. However, when heating the passenger compartment, sometimes the cooling water of the low temperature circuit becomes an extremely low temperature. In this case, the battery and the heat generating equipment are excessively cooled. As a result, sometimes the performance of the heat generating equipment, etc., decreases.

In consideration of the above problem, an object of the present disclosure is to perform efficient heating while keeping the PCU or MG or other heat generating equipment from being excessively cooled and the performance thereof from decreasing.

Solution to Problem

The present invention was made so as to solve the above problem and has as its gist the following.

(1) A vehicle-mounted temperature controller, comprising:
 a first heat circuit having a heat generating equipment heat exchanger exchanging heat with heat generating equipment, a radiator exchanging heat with the atmosphere, a first heat exchanger, and a circulation mode control device, and the first heat circuit being configured so that a first heat medium circulates therethrough; and
 a refrigeration circuit having a second heat exchanger discharging heat from the refrigerant to other than the refrigerant and the first heat medium to make the refrigerant condense, and the first heat exchanger making the refrigerant absorb heat from the first heat medium to make the refrigerant evaporate, and the refrigeration circuit being configured to realize a refrigeration cycle by circulation of the refrigerant therethrough,
 wherein the first heat circuit includes a first partial circuit through which the first heat medium flows through the radiator and the first heat exchanger, and a second partial circuit through which the first heat medium flows through the heat generating equipment heat exchanger without passing through the radiator and the first heat exchanger, and is configured so that the first heat medium can circulate simultaneously and separately at these first partial circuit and second partial circuit.

(2) The vehicle-mounted temperature controller according to above (1), wherein the circulation mode control device is configured to be able to switch between a movement state where the first heat medium is moved between the first partial circuit and the second partial circuit, and a blocked state where movement of the first heat medium is blocked between the first partial circuit and the second partial circuit.

(3) The vehicle-mounted temperature controller according to above (2), wherein the circulation mode control device is configured so as to switch between the movement state and the blocked state in accordance with the temperature of the first heat medium flowing through the second partial circuit.

(4) The vehicle-mounted temperature controller according to above (3), wherein if discharge of heat from the second heat exchanger is demanded, the circulation mode control device is set to the blocked state when the temperature of the first heat medium flowing through the first partial circuit is equal to or less than a predetermined reference temperature, and is set to the movement state when the temperature of the first heat medium is higher than the reference temperature.

(5) The vehicle-mounted temperature controller according to any one of above (2) to (4), wherein the circulation mode control device is configured to enable switching of the circulation state among the movement state, the blocked state, and a state where the first heat medium flow through the heat generating equipment heat exchanger and the radiator without flowing through the first heat exchanger.

(6) The vehicle-mounted temperature controller according to any one of above (1) to (5), further comprising a heater core heating the inside of a passenger compartment, and a second heat circuit configured so that the second heat medium circulates through the heater core, wherein the second heat exchanger exchanges heat between the refrigerant and the second heat medium so as to make heat be transferred from the refrigerant to the second heat medium.

Advantageous Effects of Invention

According to the present disclosure, efficient heating is performed while keeping the PCU or MG or other heat generating equipment from being excessively cooled and the performance thereof from decreasing.

DESCRIPTION OF EMBODIMENTS

Figure 1:
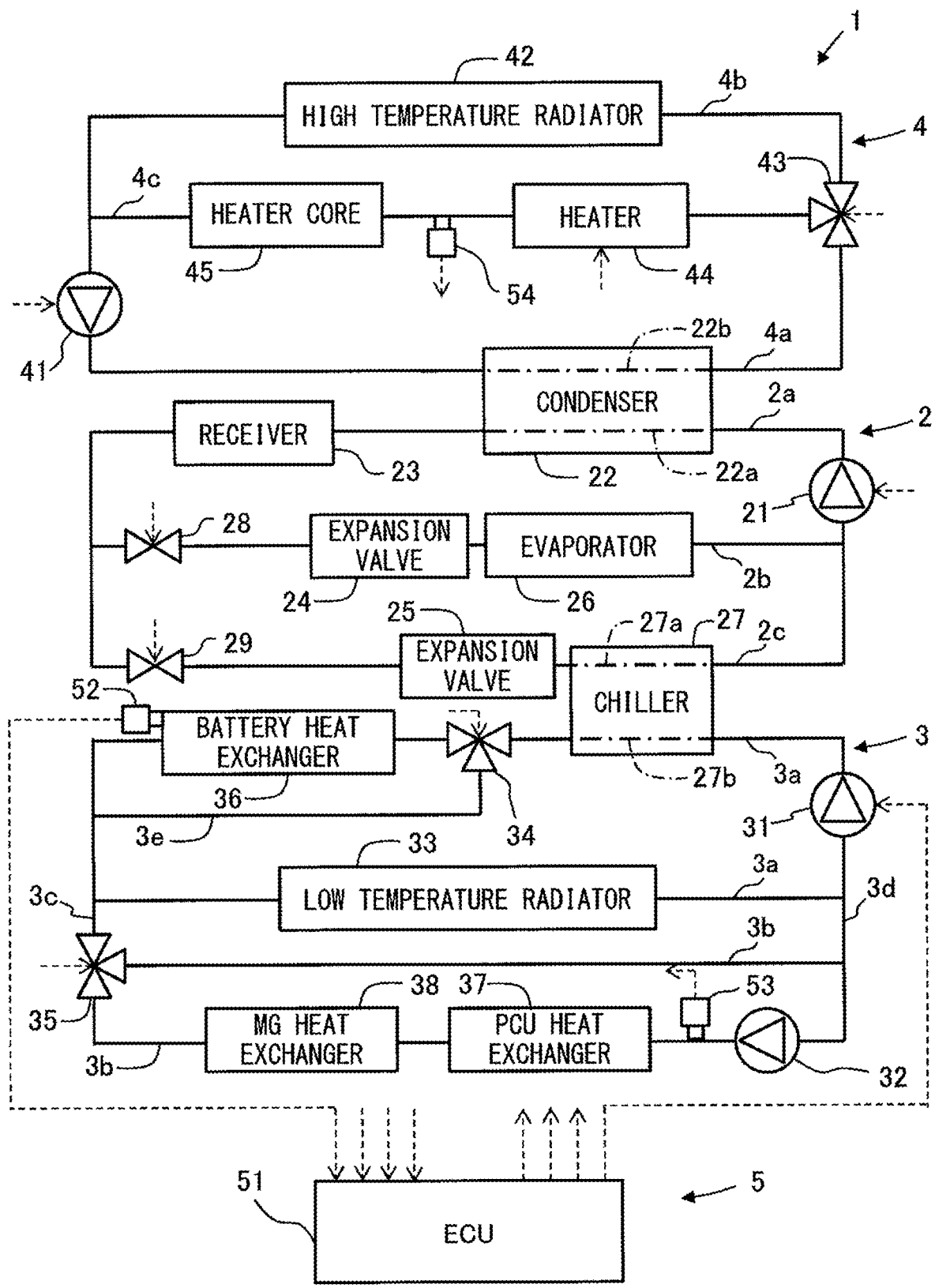
FIG. 1 is a view of the configuration schematically showing a vehicle-mounted temperature controller according to one embodiment.

Below, referring to the drawings, embodiments will be explained in detail. Note that, in the following explanation, similar components are assigned the same reference signs.

Configuration of Vehicle-Mounted Temperature Controller

Referring to FIGS. 1 to 4, the configuration of a vehicle-mounted temperature controller 1 according to one embodiment will be explained. FIG. 1 is a view of the configuration schematically showing the vehicle-mounted temperature controller 1. In the present embodiment, the vehicle-mounted temperature controller 1 is particularly mounted in an electric vehicle driven by a motor.

The vehicle-mounted temperature controller 1 includes a refrigeration circuit 2, low temperature circuit (first heat circuit) 3, high temperature circuit (second heat circuit) 4, and control device 5.

First, the refrigeration circuit 2 will be explained. The refrigeration circuit 2 includes a compressor 21, refrigerant piping 22a of a condenser 22, receiver 23, first expansion valve 24, second expansion valve 25, evaporator 26, refrigerant piping 27a of the chiller 27, first solenoid regulating valve 28, and second solenoid regulating valve 29. The refrigeration circuit 2 is configured to realize a refrigeration cycle by circulation of a refrigerant through these components. For the refrigerant, for example, a hydrofluorocarbon (for example, HFC-134a) or any other substance generally used as a refrigerant in the refrigeration cycle is used.

The refrigeration circuit 2 is divided into a refrigerant basic flow path 2a, evaporator flow path 2b, and chiller flow path 2c. The evaporator flow path 2b and the chiller flow path 2c are provided parallel to each other and are respectively connected to the refrigerant basic flow path 2a.

At the refrigerant basic flow path 2a, the compressor 21, the refrigerant piping 22a of the condenser 22, and the receiver 23 are provided in that order in a direction of circulation of the refrigerant. At the evaporator flow path 2b, the first solenoid regulating valve 28, the first expansion valve 24, and the refrigerant piping 27a of the evaporator 26 are provided in that order in a direction of circulation of the refrigerant. In addition, at the chiller flow path 2c, the second solenoid regulating valve 29, the second expansion valve 25, and the chiller 27 are provided in that order.

At the refrigerant basic flow path 2a, the refrigerant flows regardless of the opening/closing of the first solenoid regulating valve 28 and the second solenoid regulating valve 29. If the refrigerant flows to the refrigerant basic flow path 2a, the refrigerant flows through the compressor 21, the refrigerant piping 22a of the condenser 22, and the receiver 23 in that order. At the evaporator flow path 2b, the refrigerant flows when the first solenoid regulating valve 28 is opened. If the refrigerant flows to the evaporator flow path 2b, the refrigerant flows through the first solenoid regulating valve 28, the first expansion valve 24, and the refrigerant piping 27a of the evaporator 26 in that order. The refrigerant flows to the chiller flow path 2c when the second solenoid regulating valve 29 is opened. If the refrigerant flows to the chiller flow path 2c, the refrigerant flows through the second solenoid regulating valve 29, the second expansion valve 25, and the chiller 27 in that orders.

The compressor 21 functions as a compressor compressing the refrigerant to raise it in temperature. In the present embodiment, the compressor 21 is an electrically driven type, and is configured so that the discharge capacity can be changed steplessly by adjustment of the electric power supplied to the compressor 21. In the compressor 21, the mainly gaseous refrigerant with low temperature and low pressure flowing out from the evaporator 26 or the chiller 27 is adiabatically compressed, whereby it is changed to a mainly gaseous refrigerant with high temperature and high pressure.

The condenser 22 is provided with the refrigerant piping 22a and cooling water piping 22b. The condenser 22 functions as a second heat exchanger for discharging heat from the refrigerant to something other than the refrigerant and cooling water of the later explained low temperature circuit 3 to cause the refrigerant to condense. In the present embodiment, the condenser 22 exchanges heat between the refrigerant flowing through the refrigerant piping 22a and the cooling water flowing through the later explained cooling water piping 22b and transfers the heat from the refrigerant to this cooling water. The refrigerant piping 22a of the condenser 22 functions as a condenser condensing the refrigerant in the refrigeration cycle. Further, in the refrigerant piping 22a of the condenser 22, the mainly gaseous refrigerant with high temperature and high pressure, flowing out from the compressor 21, is changed to mainly liquid refrigerant with high temperature and high pressure by being isobarically cooled.

The receiver 23 stores the refrigerant condensed by the refrigerant piping 22a of the condenser 22. Further, in the condenser 22, not necessarily all of the refrigerant can be liquified, therefore the receiver 23 is configured to separate the gas and liquid. Only liquid refrigerant, from which the gaseous refrigerant is separated, flows out from the receiver 23. Note that, instead of the receiver 23, the refrigeration circuit 2 may also use a sub cool type condenser housing a gas-liquid separator as the condenser 22.

The first expansion valve 24 and the second expansion valve 25 function as expanders making the refrigerant expand. These expansion valves 24 and 25 are provided with small diameter passages, and spray refrigerant from the small diameter passages to make the pressure of the refrigerant rapidly decrease. The first expansion valve 24 sprays a mist of liquid refrigerant supplied from the receiver 23 into the evaporator 26. Similarly, the second expansion valve 25 sprays a mist of liquid refrigerant supplied from the receiver 23 into the refrigerant piping 27a of the chiller 27. At these expansion valves 24 and 25, the liquid refrigerant with high temperature and high pressure, flowing out from the receiver 23, is depressurized and partially vaporizes, whereby it is changed to a mist-like refrigerant with low temperature and low pressure. Note that, the expansion valves may be mechanical type expansion valves with fixed superheating degrees or may be electrical type expansion valves able to adjust the superheating degrees. Further, if possible to make the refrigerant expand to reduce the pressure, for example, ejectors or other devices may be used as the expanders, instead of the first expansion valve 24 and the second expansion valve 25.

The evaporator 26 functions as an evaporator causing the refrigerant to evaporate. Specifically, the evaporator 26 makes the refrigerant absorb heat from the air surrounding the evaporator 26 to make the refrigerant evaporate. Therefore, in the evaporator 26, the mist-like refrigerant with low temperature and low pressure, flowing out from the first expansion valve 24 is changed to a gaseous refrigerant with low temperature and low pressure, by evaporation. As a result, the air surrounding the evaporator 26 can be cooled and the passenger compartment can be cooled.

The chiller 27 is provided with the refrigerant piping 27a and the cooling water piping 27b. The chiller 27 functions as the first heat exchanger making the refrigerant absorb heat from the cooling water of the later explained low temperature circuit 3 to evaporate the refrigerant. In the present embodiment, the chiller 27 exchanges heat between the cooling water flowing through the later explained cooling water piping 27b and the refrigerant flowing through the refrigerant piping 27a, and transfers heat from this cooling water to the refrigerant. The refrigerant piping 27a of the chiller 27 functions as an evaporator for making the refrigerant evaporate. Further, at the refrigerant piping 27a of the chiller 27, the mist-like refrigerant with low temperature and low pressure, flowing out from the second expansion valve 25, evaporates, whereby it is changed to a gaseous refrigerant with low temperature and low pressure. As a result, the cooling water of the low temperature circuit 3 is cooled.

The first solenoid regulating valve 28 and the second solenoid regulating valve 29 are used for changing the circulation mode of refrigerant in the refrigeration circuit 2. The larger the opening degree of the first solenoid regulating valve 28, the greater the amount of the refrigerant flowing into the evaporator flow path 2b. Accordingly, the amount of refrigerant flowing into the evaporator 26 becomes greater. Further, the larger the opening degree of the second solenoid regulating valve 29, the greater the amount of refrigerant flowing into the chiller flow path 2c and accordingly the greater the amount of refrigerant flowing into the chiller 27. Note that, in the present embodiment, the solenoid regulating valve 28 is configured as a valve able to be adjusted in opening degree, but it may also be an on-off valve switched between an opened state and a closed state. Further, instead of the first solenoid regulating valve 28 and the second solenoid regulating valve 29, it is also possible to provide a three-way valve able to make the refrigerant from the refrigerant basic flow path 2a selectively flow into only the evaporator flow path 2b, only the chiller flow path 2c, and/or both. Therefore, if possible to adjust the flow rate from the refrigerant basic flow path 2a to the evaporator flow path 2b and the chiller flow path 2c, as the circulation mode control device, some sort of valve may also be provided instead of these solenoid regulating valves 28 and 29.

Next, the low temperature circuit 3 will be explained. The low temperature circuit 3 includes a first pump 31, second pump 32, the cooling water piping 27b of the chiller 27, a low temperature radiator 33, first three-way valve 34, and second three-way valve 35. In addition, the low temperature circuit 3 includes the battery heat exchanger 36, PCU heat exchanger 37, and MG heat exchanger 38. In the low temperature circuit 3, the cooling water circulates through these components Note that, the cooling water is one example of the first heat medium. Inside the low temperature circuit 3, any other heat medium may be used instead of the cooling water.

The low temperature circuit 3 includes a first partial circuit 3a, second partial circuit 3b, and two communication flow paths 3c and 3d. The first partial circuit 3a and the second partial circuit 3b are connected in parallel with each other. Therefore, the first partial circuit 3a and the second partial circuit 3b are configured to be enable simultaneous and separate circulation of cooling water.

At the first partial circuit 3a, the first pump 31, the cooling water piping 27b of the chiller 27, the battery heat exchanger 36, and the low temperature radiator 33 are provided in that order in the direction of circulation of the cooling water. Further, a bypass flow path 3e provided so as to bypass the battery heat exchanger 36 is connected to the first partial circuit 3a. In the present embodiment, the bypass flow path 3e is connected at one end between the chiller 27 and the battery heat exchanger 36 in the direction of circulation of the cooling water. In addition, the bypass flow path 3e is connected at the other end between the battery heat exchanger 36 and the low temperature radiator 33 (in particular, in the present embodiment, between the battery heat exchanger 36 and the connection part to the communication flow path 3c). Therefore, in the first partial circuit, the cooling water flows through the low temperature radiator 33 and the chiller 27.

Further, at the second partial circuit 3b, the second pump 32, PCU heat exchanger 37, and MG heat exchanger 38 are provided in that order in the direction of circulation of the cooling water. At the second partial circuit 3b, a heat exchanger exchanging heat with heat generating equipment other than the MG or PCU may also be provided. Whatever the case, in the second partial circuit 3b, the cooling water flows through the PCU heat exchanger 37 and MG heat exchanger 38 without passing through the low temperature radiator 33 and the chiller 27.

The communication flow paths 3c and 3d connect the first partial circuit 3a and the second partial circuit 3b. In the present embodiment, the first communication flow path 3c connects the upstream side of the low temperature radiator 33 of the first partial circuit 3a and the downstream side of the heat exchangers 37 and 38 of the second partial circuit 3b, The second communication flow path 3d connects the downstream side of the low temperature radiator 33 of the first partial circuit 3a and the upstream side of the heat exchangers 37 and 38 of the second partial circuit 3b. At the connection part of the second partial circuit 3b and the first communication flow path 3c, the second three-way valve 35 is provided.

The first pump 31 and the second pump 32 pump the cooling water circulating through the low temperature circuit 3. In the present embodiment, the first pump 31 and the second pump 32 are electrically driven water pumps, and are configured so as to be able to be changed in discharge capacities steplessly by adjustment of the electric power supplied to the first pump 31 and the second pump 32.

The low temperature radiator 33 is a heat exchanger exchanging heat with the cooling water circulating through the low temperature circuit 3 and the air outside of the vehicle 100 (outside air). The low temperature radiator 33 is configured to discharge heat from the cooling water to the outside air when the temperature of the cooling water is higher than the temperature of the outside air and to absorb heat from the outside air to the cooling water when the temperature of the cooling water is lower than the temperature of the outside air.

The first three-way valve 34 functions as a circulation mode control device controlling the circulation mode of the cooling water flowing out from the cooling water piping 27b of the chiller 27 and is configured so as to enable the destination of flow to be selectively changed between the battery heat exchanger 36 and the bypass flow path 3e. In the first partial circuit 3a, when the first three-way valve 34 is set at the battery heat exchanger 36 side, the cooling water flows through the first pump 31, the cooling water piping 27b of the chiller 27, the battery heat exchanger 36, and the low temperature radiator 33 in that order of the components. On the other hand, when the first three-way valve 34 is set to the bypass flow path 3e side, the cooling water does not circulate through the battery heat exchanger 36, therefore flows through only the first pump 31 and the chiller 27.

The second three-way valve 35 functions as a circulation mode control device controlling the circulation mode of the cooling water circulating through the low temperature circuit 3. In particular, the second three-way valve 35 operates in three operating states.

Figure 2A:
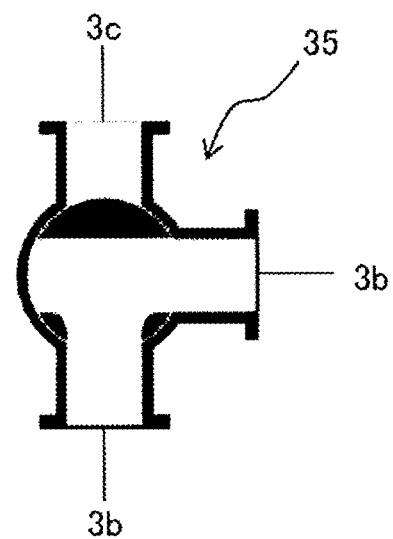
FIGS. 2A to 2C are views schematically showing three operating states of a second three-way valve.
Figure 2B:
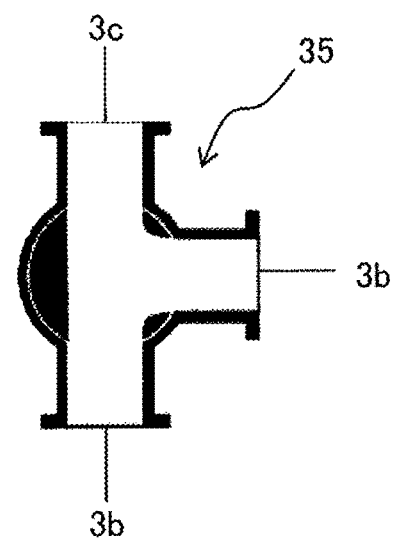
Figure 2C:
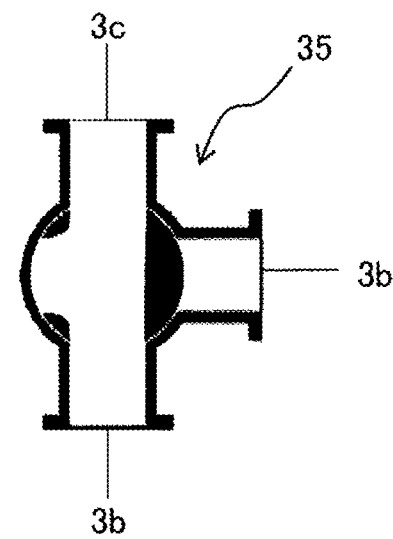

FIGS. 2A to 2C are views schematically showing the three operating states of the second three-way valve 35. In the first operating state shown in FIG. 2A, the second three-way valve 35 is in a state allowing connection of the flow paths of the second partial circuit 3b with each other and not allow connecting of the first communication flow path 3c to these flow paths. In this case, movement of cooling water between the first partial circuit 3a and the second partial circuit 3b is blocked, therefore it can be said that the second three-way valve 35 is in a blocked state blocking movement of the cooling water.

In the second operating state shown in FIG. 2B, the second three-way valve 35 is in a state connecting all of the flow paths connected to the second three-way valve 35. Therefore, in the second operating state, the first communication flow path 3c, the flow paths at the heat exchanger 37 and 38 sides of the second partial circuit 3b, and the flow path of the second pump 32 side of the second partial circuit 3b are connected with each other. In this case, cooling water can move between the first partial circuit 3a and the second partial circuit 3b, therefore the second three-way valve 35 can be said to be in a movement state making the cooling water move.

In the third operating state shown in FIG. 2C, the second three-way valve 35 is in a state connecting the first communication flow path 3c with the flow paths of the heat exchanger 37 and 38 sides of the second partial circuit 3b and not connecting the flow path of the second pump 32 side of the second partial circuit 3b to these paths.

Note that, if possible to suitably adjust the flow rate of cooling water flowing into the battery heat exchanger 36 and bypass flow path 3e, an adjusting valve or on-off valve or other circulation mode control device may be used instead of the first three-way valve 34. Similarly, if possible to control the circulation mode of the cooling water circulating through the low temperature circuit 3 to at least three operating states, an adjusting valve or on-off valve or other circulation mode control device may be used instead of the second three-way valve 35.

The battery heat exchanger 36 functions as a heat generating equipment heat exchanger exchanging heat with the battery (not shown) of the vehicle 100, which is a heat generating equipment. Specifically, the battery heat exchanger 36 is provided, for example, with piping provided surrounding the battery and is configured so as to exchange heat between the cooling water flowing through this piping and the battery. Note that, the battery of the vehicle 100 is connected with the later explained PCU and MG of the vehicle 100 and supplies electric power for driving the vehicle 100 to the MG.

The MG heat exchanger 38 functions as a heat generating equipment heat exchanger exchanging heat with the motor-generator (MG, not shown) of the vehicle 100, which is a heat generating equipment. Specifically, the MG heat exchanger 38 is configured so as to exchange heat between oil and cooling water flowing around the MG. Note that, MG is used for driving the vehicle 100 or regenerating power when braking the vehicle 100.

Further, the PCU heat exchanger 37 functions as a heat generating equipment heat exchanger exchanging heat with the power control unit (PCU, not shown) of the vehicle 100, which is a heat generating equipment. Specifically, the PCU heat exchanger 37 is provided with piping provided around the PCU and is configured so that heat is exchanged between the cooling water flowing through this piping and the battery. Note that, the PCU is connected between the battery and the MG, and controls the electric power supplied to the MG. The PCU has an inverter driving the motor, a booster converter controlling the voltage, a DC-DC converter lowering the high voltage, and other heat generating parts.

Next, the high temperature circuit 4 will be explained. The high temperature circuit 4 includes a third pump 41, the cooling water piping 22b of the condenser 22, a high temperature radiator 42, a third three-way valve 43, an electric heater 44, and a heater core 45. In the high temperature circuit 4 as well, the cooling water circulates through these components. Note that, this cooling water is one example of the second heat medium. Inside the high temperature circuit 4, any other heat medium may be used instead of the cooling water.

Further, the high temperature circuit 4 is divided into a high temperature basic flow path 4a, high temperature radiator flow path 4b, and heater flow path 4c. The high temperature radiator flow path 4b and the heater flow path 4e are provided parallel to each other, and are respectively connected to the high temperature basic flow path 4a.

At the high temperature basic flow path 4a, a third pump 41 and the cooling water piping 22b of the condenser 22 are provided in that order in the direction of circulation of the cooling water. At the high temperature radiator flow path 4b, a high temperature radiator 42 is provided. Further, at the heater flow path 4c, an electric heater 44 and heater core 45 are provided in that order in the direction of circulation of the cooling water. A third three-way valve 43 is provided between the high temperature basic flow path 4a, and high temperature radiator flow path 4b and the heater flow path 4c.

The third pump 41 pumps the cooling water circulated through the high temperature circuit 4. In the present embodiment, the third pump 41 is an electric type water pump similar to the first pump 31. Further, the high temperature radiator 42, in the same way as the low temperature radiator 33, is a heat exchanger exchanging heat between the cooling water circulating through the high temperature circuit 4 and the outside air.

The third three-way valve 43 functions as a circulation mode control device controlling the mode of circulation of the cooling water flowing out from the cooling water piping 22b of the condenser 22, and is configured so as to be able to selectively change the destination of circulation between the high temperature radiator flow path 4b and the heater flow path 4c. If the third three-way valve 43 is set at the high temperature radiator flow path 4b side, the cooling water flowing out from the cooling water piping 22b of the condenser 22 flows through the high temperature radiator flow path 4b. On the other hand, if the third three-way valve 43 is set at the heater flow path 4c side, the cooling water flowing out from the cooling water piping 22b of the condenser 22 flows through the electric heater 44 and heater core 45. Note that, if possible to suitably adjust the flow rate of cooling water flowing into the high temperature radiator flow path 4b and heater flow path 4c, an adjusting valve or on-off valve or other circulation mode control device may be used instead of the third three-way valve 43.

The electric heater 44 functions as a heater heating the cooling water. The electric heater 44 is, for example, provided with a resistance heating element placed around the piping through which the cooling water flows, and is configured so that the cooling water in the piping is heated by supplying electric power to this resistance heating element. The electric heater 44 is, for example, used for heating, when the temperature of the outside air is extremely low and as a result the refrigerant does not suitably function in the refrigeration circuit 2.

The heater core 45 is configured to exchange heat between the cooling water circulating through the high temperature circuit 4 and the air surrounding the heater core 45 to thereby heat the passenger compartment. Specifically, the heater core 45 is configured so as to discharge heat from the cooling water to the air surrounding the heater core 45. Therefore, if high temperature cooling water flows to the heater core 45, the temperature of the cooling water is decreased and the air surrounding the heater core 45 is warmed.

Figure 3:
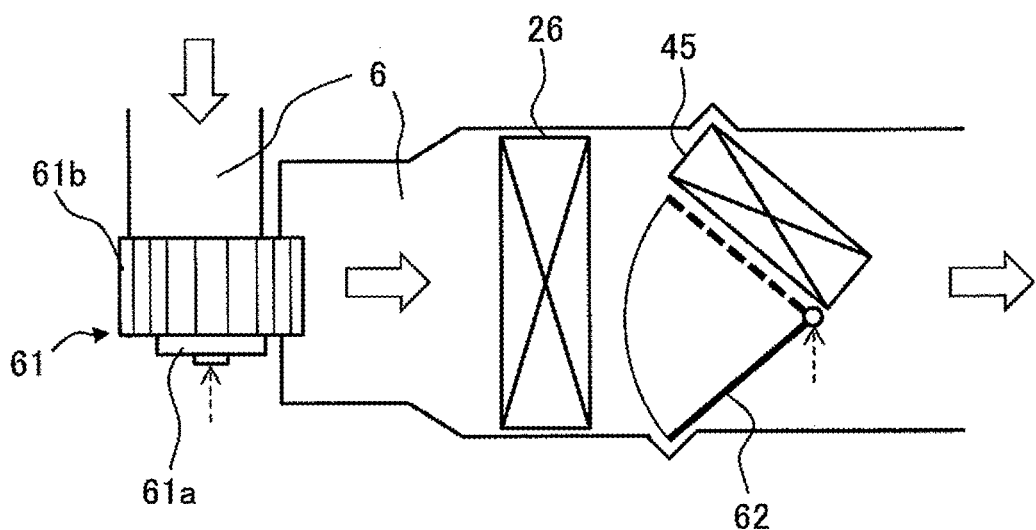
FIG. 3 is a view of the configuration schematically showing an air passage for air-conditioning a vehicle, which mounts the vehicle-mounted temperature controller.

FIG. 3 is a view of the configuration schematically showing the air passage 6 for air-conditioning the vehicle 100 mounting the vehicle-mounted temperature controller 1. In the air passage 6, air flows in the direction shown by the arrow marks in the figure. The air passage 6 shown in FIG. 3 is connected to the outside of the vehicle 100 or the air intake openings of the passenger compartment. The outside air or the air inside the passenger compartment flows into the air passage 6, according to the state of control by the control device 5. Further, the air passage 6 shown in FIG. 3 is connected to air vent openings blowing air into the passenger compartment. Air is supplied from the air passage 6 to any of the air vent openings according to the state of control by the control device 5.

As shown in FIG. 3, at the air passage 6 for air-conditioning of the present embodiment, a blower 61, evaporator 26, air mix door 62, and heater core 45 are provided in that order in the direction of flow of the air.

The blower 61 is provided with a blower motor 61a and a blower fan 61b. The blower 61 is configured so that if the blower fan 61b is driven by the blower motor 61a, the outside air or the air inside the passenger compartment flows into the air passage 6 and the air flows through the air passage 6.

The air mix door 62 adjusts the flow rate of the air flowing through the heater core 45 in the air flowing through the air passage 6, The air mix door 62 is configured to be able to be adjusted among the state where all of the air flowing through the air passage 6 flows through the heater core 45, the state where none of the air flowing through the air passage 6 flows through the heater core 45, and states between them.

In the thus configured air passage 6, when the blower 61 is driven, if the refrigerant circulates through the evaporator 26, the air flowing through the air passage 6 is cooled. Further, when the blower 61 is driven, if the cooling water circulates to the heater core 45 and the air mix door 62 is controlled so that air flows through the heater core 45, the air flowing through the air passage 6 is warmed.

Figure 4:
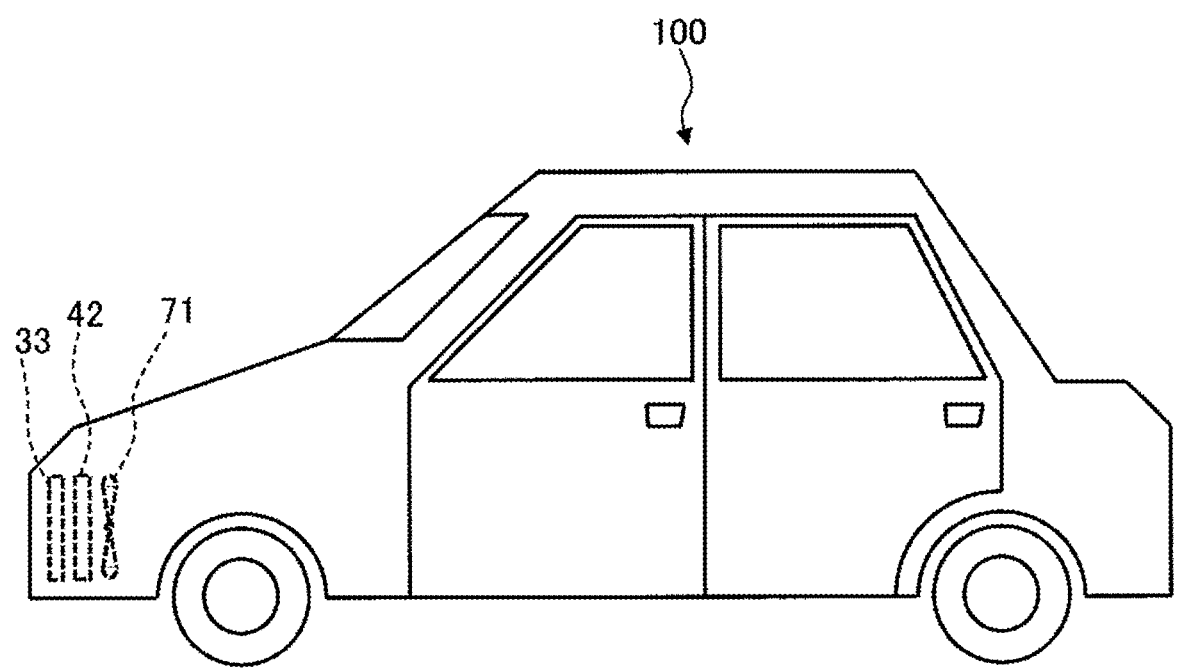
FIG. 4 is a view schematically showing the vehicle mounting the vehicle-mounted temperature controller.

FIG. 4 is a view schematically showing the vehicle 100 mounting the vehicle-mounted temperature controller 1. As shown in FIG. 4, at the inside of the front grille of the vehicle 100, a low temperature radiator 33 and high temperature radiator 42 are arranged. Therefore, when the vehicle 100 is running, wind generated based on movement of vehicle strikes these radiators 33 and 42. Further, a fan 71 is provided adjacent to these radiators 33 and 42. The fan 71 is configured so that if driven, the air strikes the radiators 33 and 42. Therefore, even when the vehicle 100 is not running, by driving the fan 71, it is possible to make air strike the radiators 33 and 42.

Referring to FIG. 1, the control device 5 is provided with an electronic control unit (ECU) 51. The ECU 51 is provided with a processor for performing various types of processing, a memory storing programs and various types of information, and an interface connected with various actuators and various sensors.

Further, the control device 5 is provided with a battery temperature sensor 52 detecting the temperature of the battery, a first water temperature sensor 53 detecting the temperature of the cooling water flowing through the second partial circuit 3b (in particular, the temperature of the cooling water flowing out from the second pump 32 and flowing into the PCU heat exchanger 37), and a second water temperature sensor 54 detecting the temperature of the cooling water flowing into the heater core 45. The ECU 51 is connected to these sensors, and output signals from these sensors are input to the ECU 51.

In addition, the ECU 51 is connected to various types of actuators of the vehicle-mounted temperature controller 1 and controls these actuators. Specifically, the ECU 51 is connected to the compressor 21, the solenoid regulating valves 28 and 29, the pumps 31 and 32, and 41, the three-way valves 34, 35, and 43, the electric heater 44, the blower motor 61a, the air mix door 62, and the fan 71 and controls the same.

Operation of Vehicle-Mounted Temperature controller
Next, referring to FIGS. 5 to 10, typical operating states of the vehicle-mounted temperature controller 1 will be explained. In FIGS. 5 to 10, a flow path through which the refrigerant or the cooling water flows is shown by a solid line, while a flow path through which the refrigerant or cooling water does not flow is shown by a broken line. Further, thin arrow marks in the figures show directions of flow of the refrigerant or cooling water, while thick arrow marks show directions of movement of heat.

Figure 5:
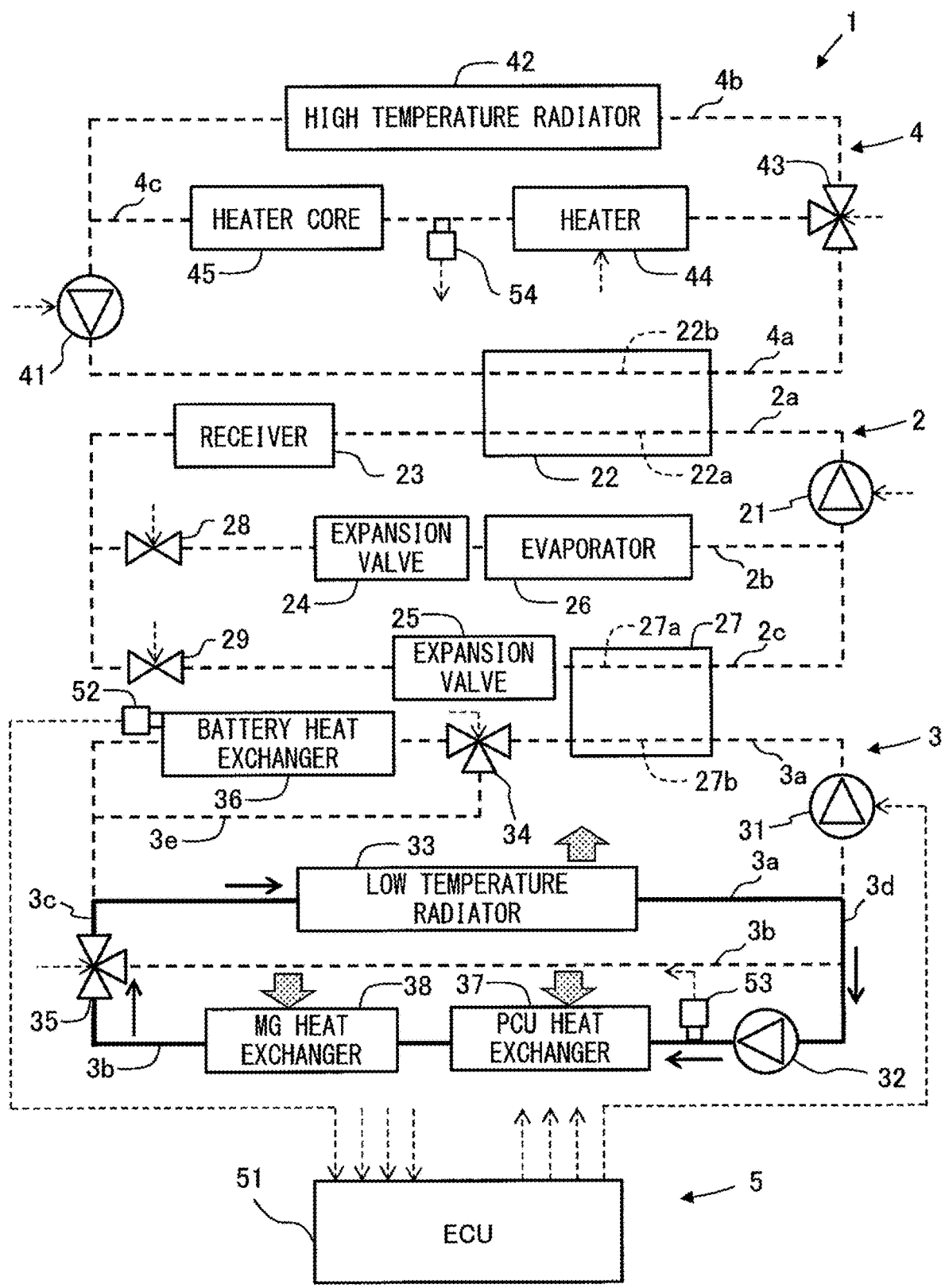
FIG. 5 shows the operating state (stopping mode) of the vehicle-mounted temperature controller in the case where the passenger compartment is neither being cooled nor heated.

FIG. 5 shows the operating state of the vehicle-mounted temperature controller 1 in the case where the passenger compartment is neither being cooled nor heated (below, also referred to as the "stopping mode").

As shown in FIG. 5, in the stopping mode, the compressor 21 and the third pump 41 are stopped. Therefore, the refrigerant does not circulate through the refrigeration circuit 2. Further, the refrigerant does not circulate through the high temperature circuit 4. On the other hand, in the stopping mode, the first pump 31 is stopped and the second pump 32 is driven. Therefore, the cooling water circulates through part of the low temperature circuit 3.

Further, in the stopping mode, the second three-way valve 35 is set to the third operating state (FIG. 2C). Therefore, at the second three-way valve 35, the first communication flow path 3c and the flow path at the heat exchanger 37 and 38 side of the second partial circuit 3b are connected, while the flow path at the second pump 32 side of the second partial circuit 3b is not connected to these flow paths. Therefore, the cooling water discharged by driving the second pump 32, as shown in FIG. 5, circulates through the low temperature circuit 3 so as to pass through the PCU heat exchanger 37, the MG heat exchanger 38, the second three-way valve 35, and the low temperature radiator 33 to again return to the second pump 32. That is, at this time, the cooling water circulates so as to pass through the PCU heat exchanger 37, the MG heat exchanger 38, and the low temperature radiator 33 without passing through the cooling water piping 27b of the chiller 27. On the other hand, the first pump 31 is stopped, whereby cooling water does not flow to the cooling water piping 27b of the chiller 27 or the battery heat exchanger 36.

As a result, in the stopping mode, at the PCU heat exchanger 37 and MG heat exchanger 38, the heat of the PCU and MG is transferred to the cooling water. For this reason, the PCU and MG are cooled and the temperature of the cooling water rises to equal to or greater than the temperature of the outside air. After that, the cooling water is cooled at the low temperature radiator 33 by heat exchange with the outside air, and again flows to the PCU heat exchanger 37 and MG heat exchanger 38. Therefore, in the stopping mode, heat is absorbed at the PCU heat exchanger 37 and MG heat exchanger 38 from the PCU or MG and that heat is discharged at the low temperature radiator 33.

Figure 6:
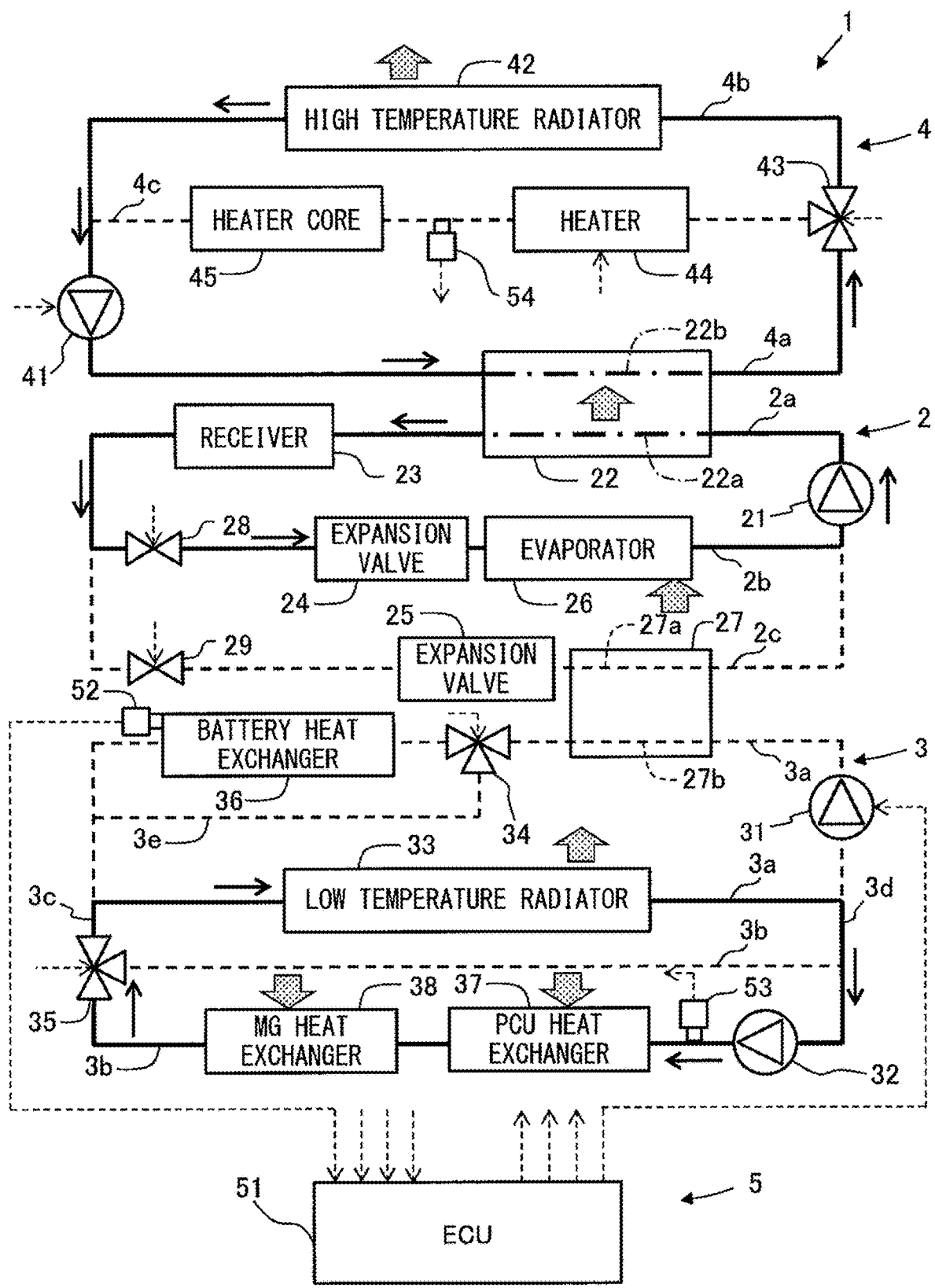
FIG. 6 shows the operating state (cooling mode) of the vehicle-mounted temperature controller in the case where the passenger compartment is being cooled.

FIG. 6 shows the operating state of the vehicle-mounted temperature controller 1 in the case where the passenger compartment is being cooled (below, referred to as the "cooling mode").

As shown in FIG. 6, in the cooling mode, the compressor 21 and the third pump 41 are driven. Therefore, the refrigerant circulates through the refrigeration circuit 2 while the cooling water circulates through the high temperature circuit 4. Further, in the cooling mode, in the same way as the stopping mode, the first pump 31 is stopped and the second pump 32 is driven. Therefore, the cooling water circulates through part of the low temperature circuit 3.

Further, in the cooling mode, the first solenoid regulating valve 28 is opened and the second solenoid regulating valve 29 is closed. Therefore, the refrigerant circulates through the evaporator 26, but the refrigerant does not circulate through the chiller 27. Further, in the cooling mode, the third three-way valve 43 is set so that cooling water circulates through the high temperature radiator flow path 4b.

In addition, the operating state of the second three-way valve 35 is set to the third operating state (FIG. 2(C)), in the same way as the stopping mode. Therefore, in the cooling mode as well, the cooling water discharged by driving the second pump 32, as shown in FIG. 6, passes through the PCU heat exchanger 37, the MG heat exchanger 38, the second three-way valve 35, and the low temperature radiator 33 to again return to the second pump 32.

As a result, in the cooling mode, at the evaporator 26, the heat of the surrounding air is transferred to the refrigerant whereby the surrounding air is cooled. On the other hand, at the condenser 22, the heat of the refrigerant is transferred to the high temperature circuit 4 whereby the cooling water in the high temperature circuit 4 is warmed. After that, this high temperature cooling water is cooled at the high temperature radiator 42 by heat exchange with the outside air and again flows into the condenser 22. Therefore, in the cooling mode, heat is absorbed from the surrounding air at the evaporator 26, and the heat is discharged at the high temperature radiator 42. In addition, in the cooling mode, at the low temperature circuit 3, the heat is absorbed from the PCU or MG at the PCU heat exchanger 37 and MG heat exchanger 38, and that heat is discharged at the low temperature radiator 33.

Note that, in the example shown in FIGS. 5 and 6, the case where the battery does not need to be cooled is shown, but the first pump 31 may also be driven, if the battery has become a high temperature and cooling is required. As a result, part of the cooling water flowing out from the low temperature radiator 33 flows to the cooling water piping 27b of the chiller 27 and to the battery heat exchanger 36 whereby the battery can be cooled.

Figure 7:
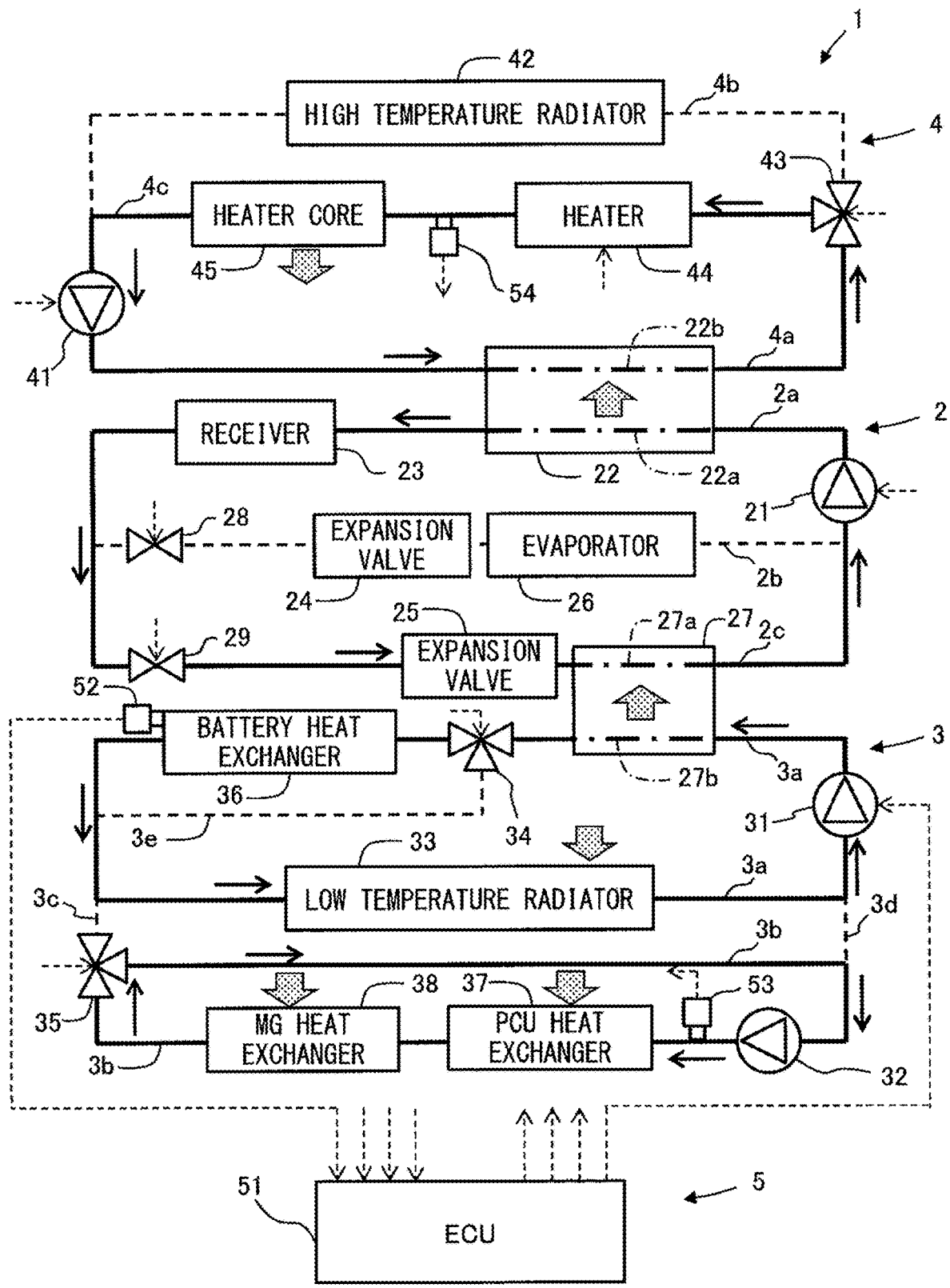
FIG. 7 shows the operating state (first heating mode) of the vehicle-mounted temperature controller in the case where the passenger compartment is being heated and the temperature of the PCU or MG is not that high.
Figure 8:
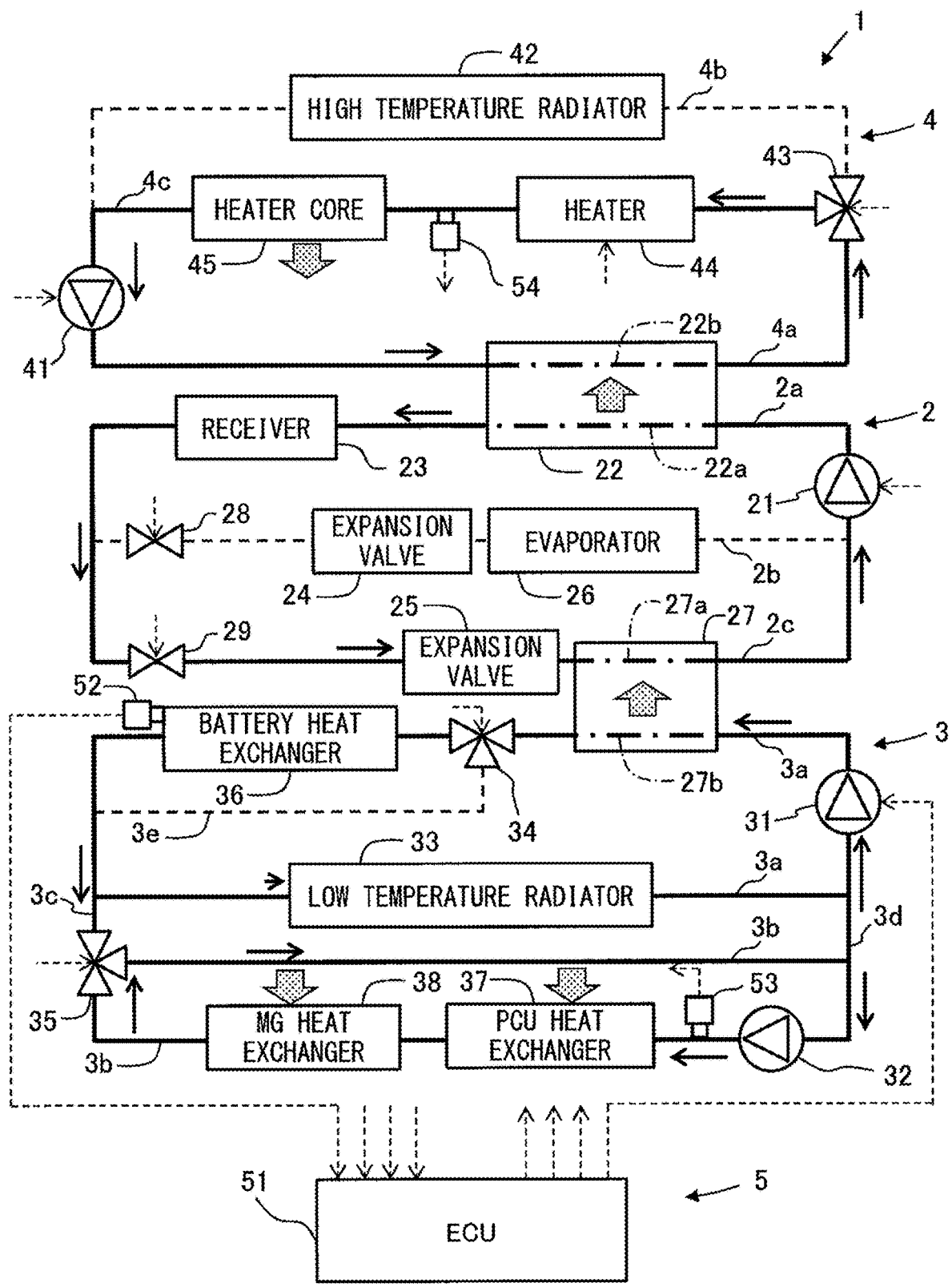
FIG. 8 shows the operating state (second heating mode) of the vehicle-mounted temperature controller in the case where the passenger compartment is being heated and the temperature of the PCU or MG is high.

FIGS. 7 and 8 show the operating state of the vehicle-mounted temperature controller 1 in the case where the passenger compartment is being heated (below, referred to as the "heating mode"). In particular, FIG. 7 shows the operating state in the case where the temperature of the PCU or MG is not that high (below, referred to as the "first heating mode"). Further, FIG. 8 shows the operating state in the case where the temperature of the PCU or MG is high (below, referred to as the "second heating mode").

As shown in FIGS. 7 and 8, in the heating mode, both the compressor 21 and the third pump 41 are operated. Therefore, the refrigerant or cooling water circulates in the refrigeration circuit 2 and high temperature circuit 4.

Further, in the heating mode, the first solenoid regulating valve 28 is closed and the second solenoid regulating valve 29 is opened. Therefore, the refrigerant does not circulate through the evaporator 26, while the refrigerant circulates through the chiller 27. Accordingly, in the heating mode, the refrigerant in the refrigeration circuit 2 circulates through the compressor 21, the refrigerant piping 22a of the condenser 22, the second expansion valve 25, and the refrigerant piping 27a of the chiller 27.

Further, in the heating mode, the third three-way valve 43 is set so that the cooling water circulates through the heater flow path 4c. Accordingly, in the heating mode, the cooling water in the high temperature circuit 4 circulates through the third pump 41, the cooling water piping 22b of the condenser 22, and the heater core 45.

In addition, in the heating mode, both of the first pump 31 and the second pump 32 are operated. Further, in the first heating mode shown in FIG. 7, the second three-way valve 35 is set to the first operating state. Therefore, in the first heating mode, part of the cooling water of the low temperature circuit 3 passes through the first pump 31, the cooling water piping 27b of the chiller 27, the battery heat exchanger 36, and the low temperature radiator 33, that is, circulates through the first partial circuit 3a. In addition, the remaining cooling water passes through the second pump 32, the PCU heat exchanger 37, and the MG heat exchanger 38, that is, circulates through the second partial circuit 3b. In particular, in the present embodiment, if the second three-way valve 35 is set to the first operating state, the second three-way valve 35 enters the blocked state where movement of cooling water between the first partial circuit 3a and the second partial circuit 3b is blocked. Accordingly, cooling water simultaneously and separately circulates through the first partial circuit 3a and the second partial circuit 3b.

On the other hand, in the second heating mode shown in FIG. 8, the second three-way valve 35 is set to the second operating state. Therefore, in the second heating mode, the cooling water flowing through the first pump 31, the cooling water piping 27b of the chiller 27, and the battery heat exchanger 36 can flow through both of the low temperature radiator 33 and its bypass flow path (part of the second partial circuit 3b). Similarly, the cooling water flowing through the second pump 32, the PCU heat exchanger 37, and the MG heat exchanger 38 also can flow through both of the low temperature radiator 33 and its bypass flow path. Therefore, if the second three-way valve 35 is set to the second operating state, it can be said that the second three-way valve 35 enters the movement state where cooling water is moved between the first partial circuit 3a and the second partial circuit 3b.

As a result, in the heating mode shown in FIGS. 7 and 8, at the chiller 27, the heat of the cooling water in the low temperature circuit 3 is transferred to the refrigerant, and this cooling water is cooled. Further, at the condenser 22, the heat of the refrigerant is transferred to the high temperature circuit 4 and the cooling water in the high temperature circuit 4 is warmed. After that, this high temperature cooling water is cooled at the heater core 45 by heat exchange with the surrounding air. Along with this, the surrounding air is raised in temperature. Therefore, in the heating mode, heat is absorbed at the chiller 27 from cooling water of the low temperature circuit 3, and that heat is discharged at the heater core 45.

Further, in the first heating mode illustrated in FIG. 7, the cooling water circulates through the PCU heat exchanger 37 and MG heat exchanger 38, therefore the heat of the PCU and MG is transferred to the cooling water in the PCU heat exchanger 37 and MG heat exchanger 38. Further, the cooling water in the low temperature circuit 3 cooled at the chiller 27 flows to the low temperature radiator 33. Heat is absorbed at the low temperature radiator 33 from the outside air by the cooling water. Therefore, in the first heating mode, heat is absorbed at the low temperature radiator 33 from the outside air, that heat is discharged at the chiller 27, and finally that heat is discharged at the heater core 45.

On the other hand, in the second heating mode shown in FIG. 8, the cooling water flows mainly through the bypass flow path among the low temperature radiator 33 and its bypass flow path. This is because the flow resistance of the low temperature radiator 33 is larger than the bypass flow path. Therefore, the cooling water in the low temperature circuit 3 cooled by the chiller 27 flows through both of the first partial circuit 3a and the second partial circuit 3b, and heat is absorbed at the PCU heat exchanger 37 and MG heat exchanger 38 from the PCU and MG by the cooling water, Therefore, in the second heating mode, heat is absorbed at the PCU heat exchanger 37 and MG heat exchanger 38 from the PCU and MG by the cooling water, the heat is discharged at the chiller 27, and finally the heat is discharged at the heater core 45.

Note that, in the heating mode shown in FIGS. 7 and 8, the first three-way valve 34 is set to the battery heat exchanger 36 side. However, it may also be set to the bypass flow path 3e side. Specifically, when the temperature of the battery is higher than a predetermined battery upper limit temperature, the first three-way valve 34 is set to the battery heat exchanger 36 side, while when the temperature of the battery is equal to or less than the battery upper limit temperature, the first three-way valve 34 is set to the bypass flow path 3e side. As a result, when the temperature of the battery is low, the battery is prevented from being further cooled.

Figure 9:
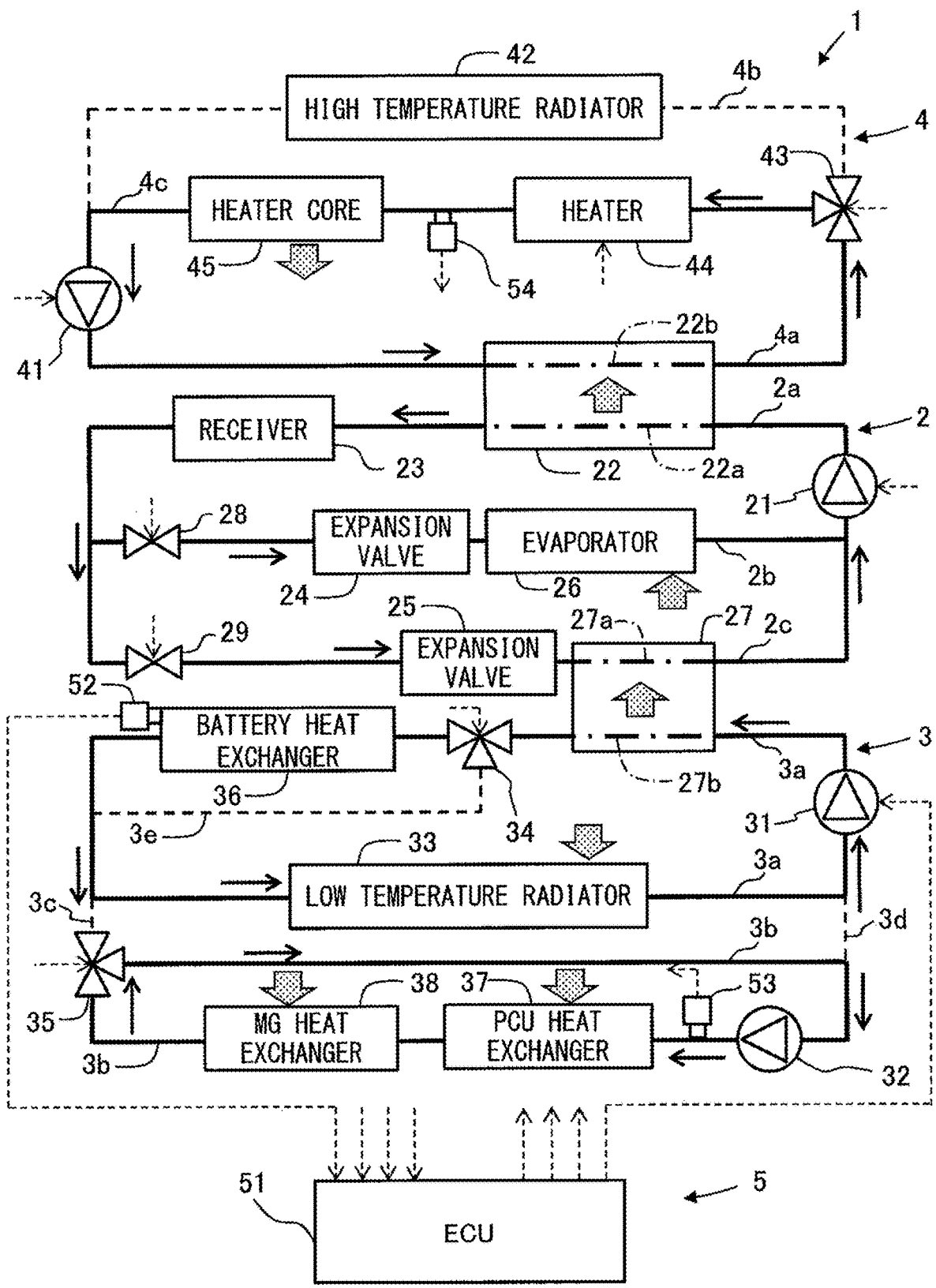
FIG. 9 shows the operating state (first dehumidifying and heating mode) of the vehicle-mounted temperature controller in the case where the passenger compartment is being dehumidified and heated and the temperature of the PCU or MG is not that high.
Figure 10:
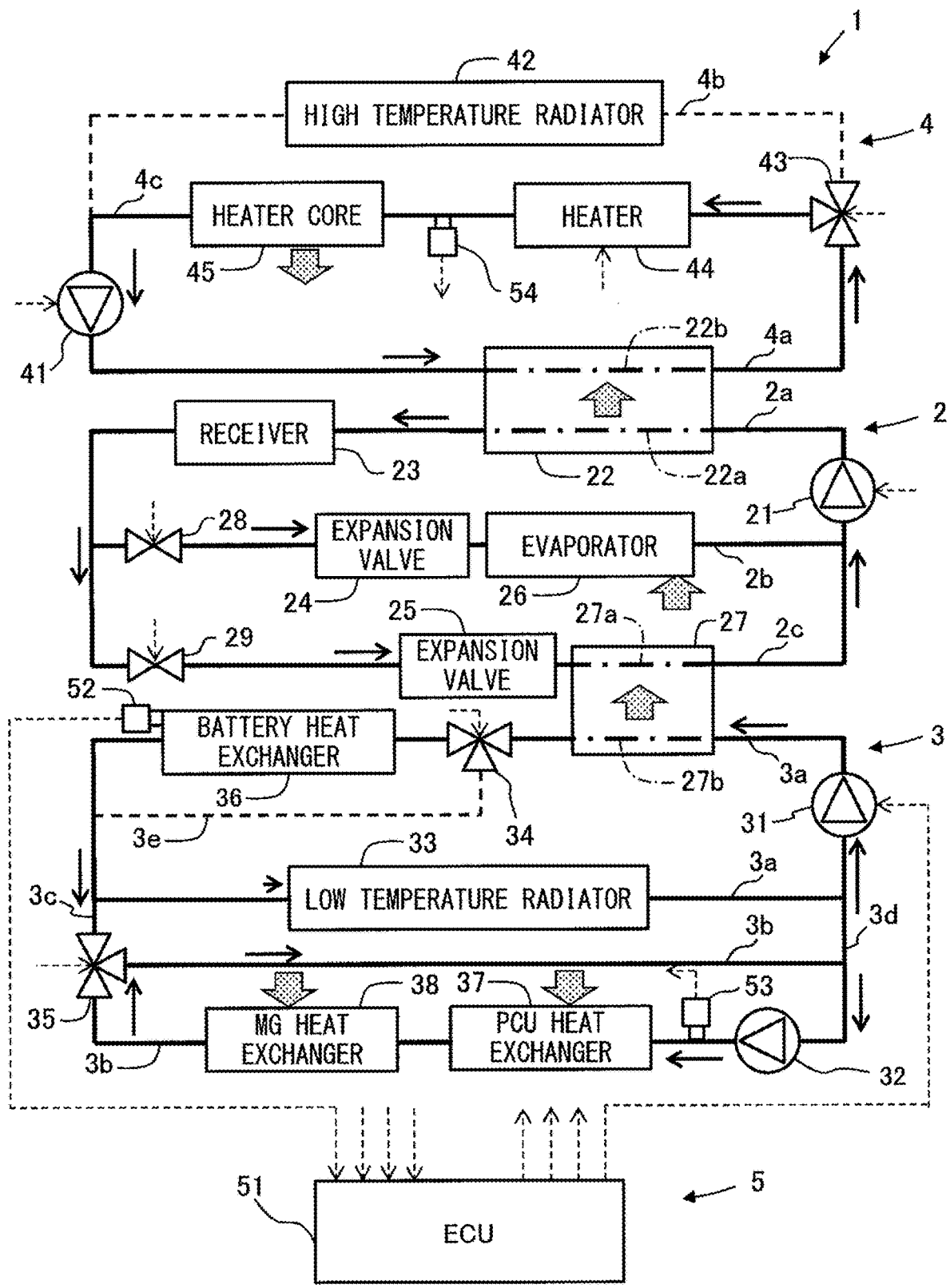
FIG. 10 shows the operating state (second dehumidifying and heating mode) of the vehicle-mounted temperature controller in the case where the passenger compartment is being dehumidified and heated and the temperature of the PCU or MG is high.

FIGS. 9 and 10 show the operating state of the vehicle-mounted temperature controller 1 in the case where the passenger compartment is being dehumidified and heated (below, referred to as the "dehumidifying and heating mode"). In particular, FIG. 9 shows the operating state in the case where the temperature of the PCU or MG is not that high (below, referred to as the "first dehumidifying and heating mode"). Further, FIG. 10 shows the operating state in the case where the temperature of the PCU or MG is high (below, referred to as the "second dehumidifying and heating mode").

In the first dehumidifying and heating mode, as shown in FIG. 9, the vehicle-mounted temperature controller 1 is in an operating state similar to the first heating mode except for the first solenoid regulating valve 28. The first solenoid regulating valve 28 was closed in the first heating mode, while is opened in the first dehumidifying and heating mode. Similarly, in the second dehumidifying and heating mode, as shown in FIG. 10, the vehicle-mounted temperature controller 1 is in an operating state similar to the second heating mode except for the first solenoid regulating valve 28. The first solenoid regulating valve 28 was closed in the second heating mode, while is opened in the second dehumidifying and heating mode. The opening degree of the first solenoid regulating valve 28 and the opening degree of the second solenoid regulating valve 29 are set in accordance with the strength of the dehumidifying and strength of the heating.

As a result, in the dehumidifying and heating mode, the refrigerant of the refrigeration circuit 2 circulates through both of the chiller 27 and evaporator 26. Therefore, at the chiller 27, the heat of the cooling water of the low temperature circuit 3 is transferred to the refrigerant, and this cooling water is cooled. In addition, at the evaporator 26, the heat of the surrounding air is transferred to the refrigerant, and the surrounding air is cooled. Therefore, in the dehumidifying and heating mode, heat is absorbed at the low temperature radiator 33 from the outside air or heat is absorbed at the PCU heat exchanger 37 and MG heat exchanger 38 from the PCU and MG, and heat is absorbed from the surrounding air at the evaporator 26, and these absorbed heats are discharged at the heater core 45.

Control of Vehicle-Mounted Temperature controller

Figure 11:
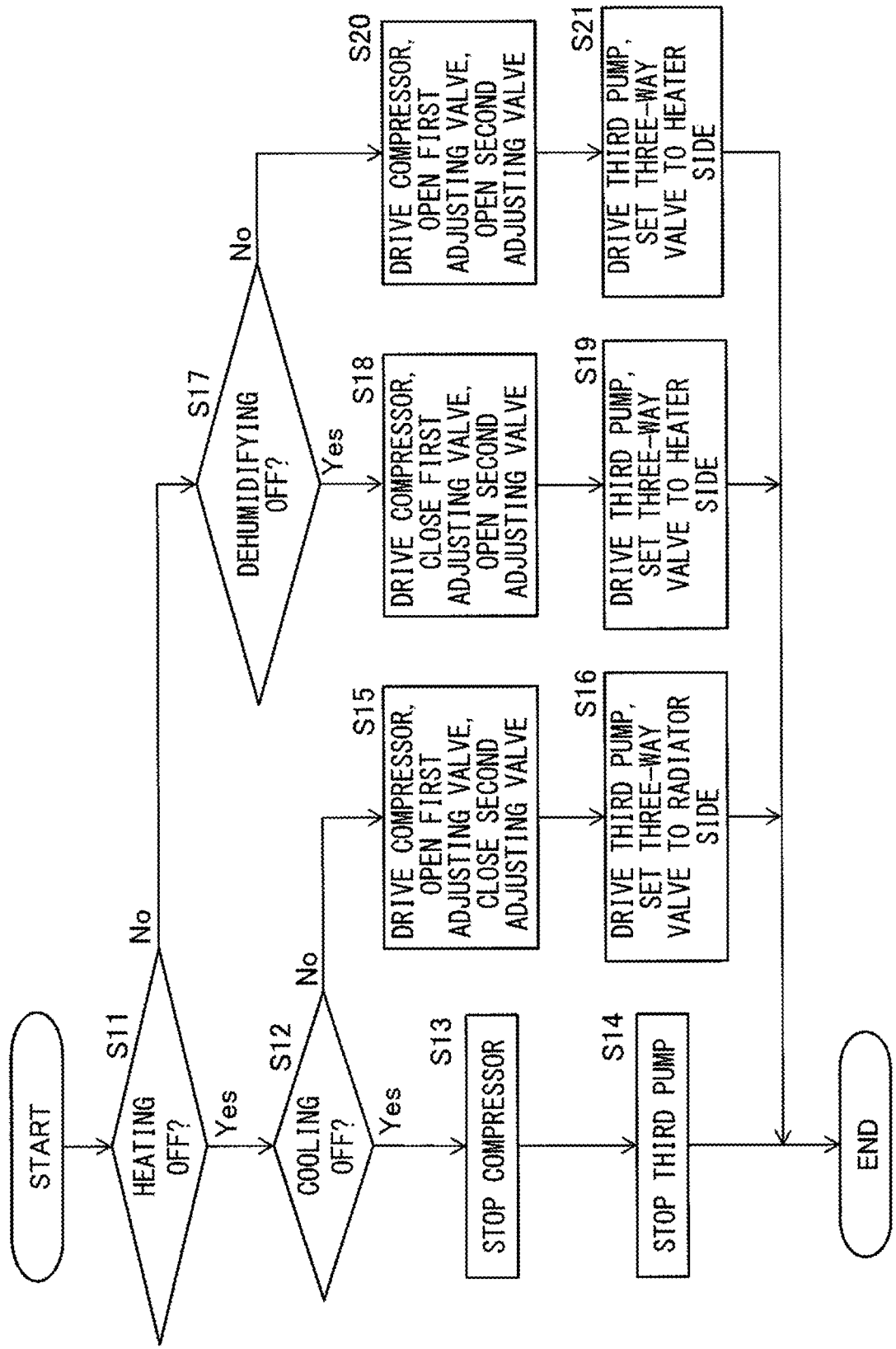
FIG. 11 is a flow chart showing a control routine of a refrigeration circuit and high temperature circuit of the vehicle-mounted temperature controller.

Next, referring to FIGS. 11 and 12, control of the vehicle-mounted temperature controller 1 will be explained. FIG. 11 is a flow chart showing a control routine of the refrigeration circuit 2 and high temperature circuit 4 of the vehicle-mounted temperature controller 1. The illustrated control routine is performed at the control device 5 every constant time interval.

First, at step S11, it is determined if the heating mode of the vehicle 100 has been OFF. The ON/OFF state of the heating mode of the vehicle 100 is, for example, automatically switched based on the temperature setting of the user, the temperature in the passenger compartment, etc. Further, the ON/OFF state of the heating mode may also be automatically switched based on the ON/OFF state of the operating switch of the defroster provided at the vehicle 100. If, at step S11, it is determined that the heating mode has been OFF, the control routine proceeds to step S12.

At step S12, it is determined if the cooling mode of the vehicle 100 has been OFF. The ON/OFF state of the cooling mode of the vehicle 100 is also, for example, automatically switched based on the temperature setting of the user, the temperature in the passenger compartment, etc. If, at step S12, it is determined that the cooling mode has been OFF, the control routine proceeds to step S13.

At step S13, the compressor 21 is stopped, while, at step S14, the third pump 41 is stopped and the control routine is ended.

On the other hand, if, at step S12, it is determined that the cooling mode of vehicle 100 is ON, the control routine proceeds to step S15. At step S15, the compressor 21 is driven, the first solenoid regulating valve 28 is opened, and the second solenoid regulating valve 29 is closed. Next, at step S16, the third pump 41 is driven, the third three-way valve 43 is set to the high temperature radiator flow path 4*b* side, and the control routine is ended.

Further, if, at step S11, it is determined that the heating mode of the vehicle 100 has been ON, the control routine proceeds to step S17. At step S17, it is determined if the dehumidifying mode of the vehicle 100 has been OFF. The ON/OFF state of the dehumidification of the vehicle 100 is, for example, automatically switched based on the ON/OFF state of the dehumidifying or defroster operation switch, the temperature setting of the user, the temperature in the passenger compartment, etc.

If, at step S17, it is determined that the dehumidifying mode has been OFF, the control routine proceeds to step S18. At step S18, the compressor 21 is driven, the first solenoid regulating valve 28 is closed, and the second solenoid regulating valve 29 is opened. Next, at step S19, the third pump 41 is driven, the third three-way valve 43 is set to the heater flow path 4*e* side, and the control routine is ended.

On the other hand, if, at step S17, it is determined that the dehumidifying mode has been ON, the control routine proceeds to step S20. At step S20, the compressor 21 is driven, and both the first solenoid regulating valve 28 and the second solenoid regulating valve 29 are opened. Next, at step S21, the third pump 41 is driven and the third three-way valve 43 is set to the heater flow path 4*c* side, then the control routine is ended.

Figure 12:
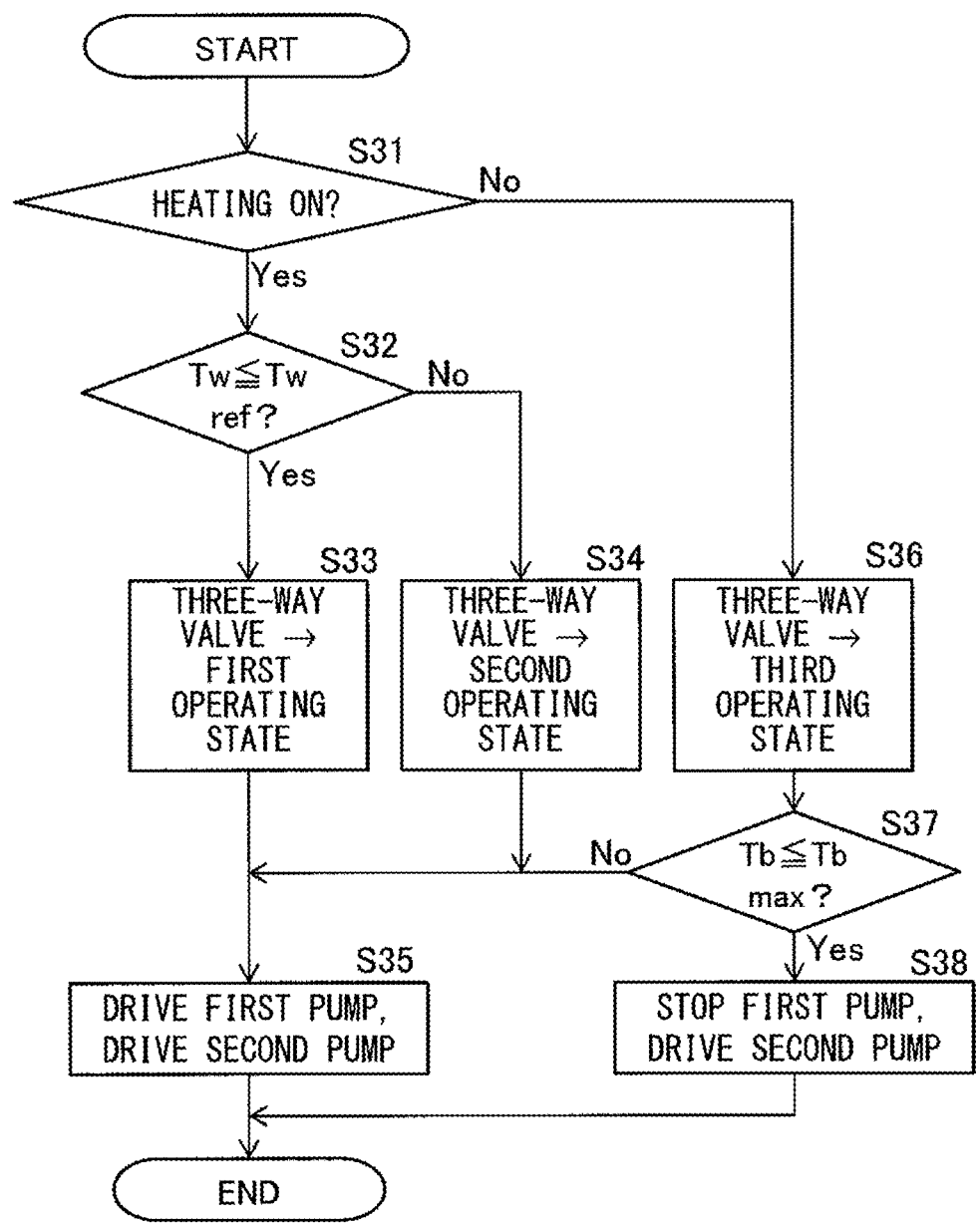
FIG. 12 is a flow chart showing a control routine of a low temperature circuit of the vehicle-mounted temperature controller.

FIG. 12 is a flow chart showing a control routine of the low temperature circuit 3 of the vehicle-mounted temperature controller 1. The illustrated control routine is performed at the control device 5 every constant time interval.

First, at step S31, it is determined if the heating mode of vehicle 100 is ON. If it is determined that the heating mode of the vehicle 100 is ON, that is, if discharge of heat from the refrigerant is demanded at the condenser 22, the control routine proceeds to step S32.

At step S32, it is determined if the temperature Tw of the cooling water in the low temperature circuit 3 (in particular, the temperature of the cooling water in the second partial circuit 3*b*) is equal to or less than a predetermined reference temperature Twref. The temperature Tw of the cooling water of the low temperature circuit 3 is, for example, detected by the first water temperature sensor 53. Further, the reference temperature Twref is a temperature at which the temperature of the PCU becomes excessively high and the PCU would have a breakdown if the temperature of the cooling water becomes further higher, or a predetermined temperature less than that temperature, for example, 65° C.

If, at step S32, it is determined that the temperature Tw of the cooling water of the low temperature circuit 3 is equal to or less than the reference temperature Twref, the control routine proceeds to step S33. At step S33, the second three-way valve 35 is set to the first operating state. Therefore, the movement of the cooling water between the first partial circuit 3*a* and the second partial circuit 3*b* is blocked. On the other hand, if, at step S32, it is determined that the temperature Tw of the cooling water of the low temperature circuit 3 is higher than the reference temperature Twref, the control routine proceeds to step S34. At step S34, the second three-way valve 35 is set to the second operating state. Therefore, the cooling water moves between the first partial circuit 3*a* and the second partial circuit 3*b*. After that, at step S35, the first pump 31 and the second pump 32 are both driven and the control routine is ended.

On the other hand, if, at step S31, it is determined if the heating mode of the vehicle 100 is OFF, that is, if discharge of heat from the refrigerant at the condenser 22 is not demanded, the control routine proceeds to step S36.

At step S36, the second three-way valve 35 is set to the third operating state. Therefore, the cooling water in the low temperature circuit 3 circulates through the PCU heat exchanger 37, MG heat exchanger 38, and low temperature radiator 33.

Next, at step S37, it is determined if the temperature Tb of the battery is equal to or less than the battery upper limit temperature Tbmax. The temperature Tb of the battery is, for example, detected by the battery temperature sensor 52. Further, the battery upper limit temperature Tbmax is the temperature at which the battery would be deteriorated or a performance thereof would be decreased if the temperature of the battery rises further, and for example, is 40° C.

If, at step S37, it is determined that the temperature Tb of the battery is equal to or less than the battery upper limit temperature Tbmax, the control routine proceeds to step S38. At step S38, the first pump 31 is stopped and the second pump 32 is driven. On the other hand, if, at step S37, it is determined that the temperature Tb of the battery is higher than the battery upper limit temperature Tbmax, the control routine proceeds to the above-mentioned step S35.

Action and Effects

Next, the action and effects exhibited by the vehicle-mounted temperature controller 1 according to the present embodiment will be explained. First, according to the vehicle-mounted temperature controller 1 according to the present embodiment, in addition to heating and cooling of the passenger compartment, cooling of the heat generating equipment is also performed by a single refrigeration circuit 2. Therefore, there is no need to provide separate refrigeration circuits 2 for air-conditioning and for cooling the heat generating equipment, and thus it is possible to keep down the manufacturing cost of the vehicle-mounted temperature controller 1.

Further, in the vehicle-mounted temperature controller 1 according to the present embodiment, when performing heating or dehumidifying and heating of the passenger compartment, as shown in FIGS. 7 and 9, the cooling water cooled at the chiller 27 does not flow through the MG heat exchanger 38 or PCU heat exchanger 37, but flows through the low temperature radiator 33 whereby heat is absorbed by the cooling water at the low temperature radiator 33. Therefore, the MG or PCU is kept from being excessively cooled. Further, heat is absorbed by the cooling water at the low temperature radiator 33 from the outside air with its extremely large heat capacity, therefore efficient heating can be performed. In addition, at this time, the cooling water circulates through the PCU heat exchanger 37 and MG heat exchanger 38, therefore even if the temperature of the PCU or MG temporarily rapidly rises, these PCU and MG are kept from excessively rising in temperature.

Further, in the operating state shown in FIGS. 7 and 9, the cooling water passing through the PCU heat exchanger 37 and MG heat exchanger 38 does not circulate through the low temperature radiator 33 and the chiller 27, therefore a large amount of heat is not radiated. For this reason, if heat continues to be generated at the PCU or MG, there is a possibility of the temperature of the cooling water circulating through the PCU heat exchanger 37 and MG heat exchanger 38 excessively rising.

As opposed to this, in the vehicle-mounted temperature controller 1 according to the present embodiment, if the temperature of the cooling water flowing into the PCU heat exchanger 37 becomes higher than the reference temperature, the second three-way valve 35 is set so that the cooling water cooled by passing through the chiller 27 flows into the PCU heat exchanger 37 and MG heat exchanger 38. For this reason, the temperature of the cooling water flowing into the PCU heat exchanger 37 and MG heat exchanger 38 is decreased, and therefore this temperature of the cooling water is kept from excessively rising.

Modifications

Note that, in the above embodiments, the high temperature circuit 4 was provided, but instead of providing the high temperature circuit 4, the temperature controller may also be configured so that the condenser 22 directly heats the air in the air passage 6 (that is, so as to function as a heater core).

Above, preferred embodiments according to the present disclosure were explained, but the present disclosure is not limited to these embodiments and can be corrected and changed in various ways within the language of the claims.

The invention claimed is:

1. A vehicle-mounted temperature controller, comprising:
a first heat circuit having a heat generating equipment heat exchanger exchanging heat with heat generating equipment, a radiator exchanging heat with the atmosphere, a first heat exchanger, and a circulation mode control device, and the first heat circuit being configured so that a first heat medium circulates therethrough; and
a refrigeration circuit having a second heat exchanger discharging heat from the refrigerant to other than the refrigerant and the first heat medium to make the refrigerant condense, and the first heat exchanger making the refrigerant absorb heat from the first heat medium to make the refrigerant evaporate, and the refrigeration circuit being configured to realize a refrigeration cycle by circulation of the refrigerant therethrough,
wherein the first heat circuit includes a first partial circuit through which the first heat medium flows through the radiator and the first heat exchanger, and a second partial circuit through which the first heat medium flows through the heat generating equipment heat exchanger without passing through the radiator and the first heat exchanger, and is configured so that the first heat medium can circulate simultaneously and separately at these first partial circuit and second partial circuit.

2. The vehicle-mounted temperature controller according to claim 1, wherein the circulation mode control device is configured to be able to switch between a movement state where the first heat medium is moved between the first partial circuit and the second partial circuit, and a blocked state where movement of the first heat medium is blocked between the first partial circuit and the second partial circuit.

3. The vehicle-mounted temperature controller according to claim 2, wherein the circulation mode control device is configured so as to switch between the movement state and the blocked state in accordance with the temperature of the first heat medium flowing through the second partial circuit.

4. The vehicle-mounted temperature controller according to claim 3, wherein if discharge of heat from the second heat exchanger is demanded, the circulation mode control device is set to the blocked state when the temperature of the first heat medium flowing through the first partial circuit is equal to or less than a predetermined reference temperature, and is set to the movement state when the temperature of the first heat medium is higher than the reference temperature.

5. The vehicle-mounted temperature controller according to claim 2, wherein the circulation mode control device is configured to enable switching of the circulation state among the movement state, the blocked state, and a state where the first heat medium flow through the heat generating equipment heat exchanger and the radiator without flowing through the first heat exchanger.

6. The vehicle-mounted temperature controller according to claim 1, further comprising a heater core heating the inside of a passenger compartment, and a second heat circuit configured so that the second heat medium circulates through the heater core,
wherein the second heat exchanger exchanges heat between the refrigerant and the second heat medium so as to make heat be transferred from the refrigerant to the second heat medium.

* * * * *